E. RICARD.
MANUFACTURE OF ACETONE.
APPLICATION FILED JUNE 7, 1918.

1,385,888.

Patented July 26, 1921.
4 SHEETS—SHEET 1.

Inventor:
Eloi Ricard
By Attorneys,
Fraser, Twk & Myers

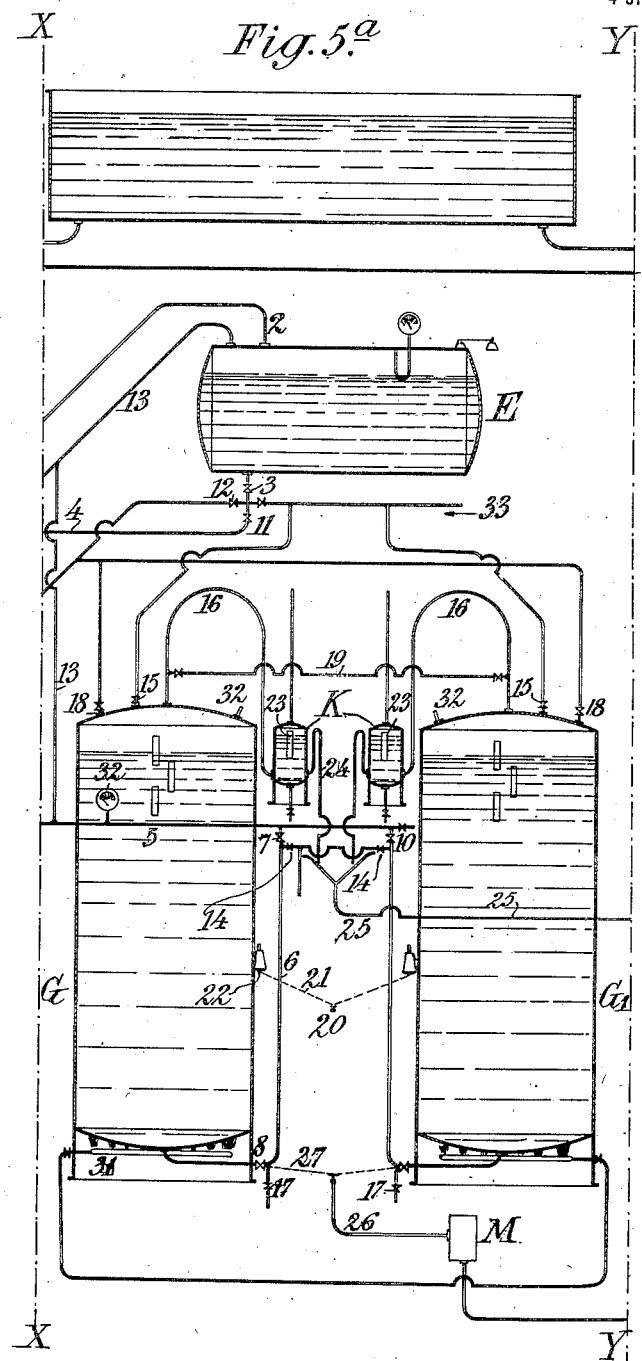

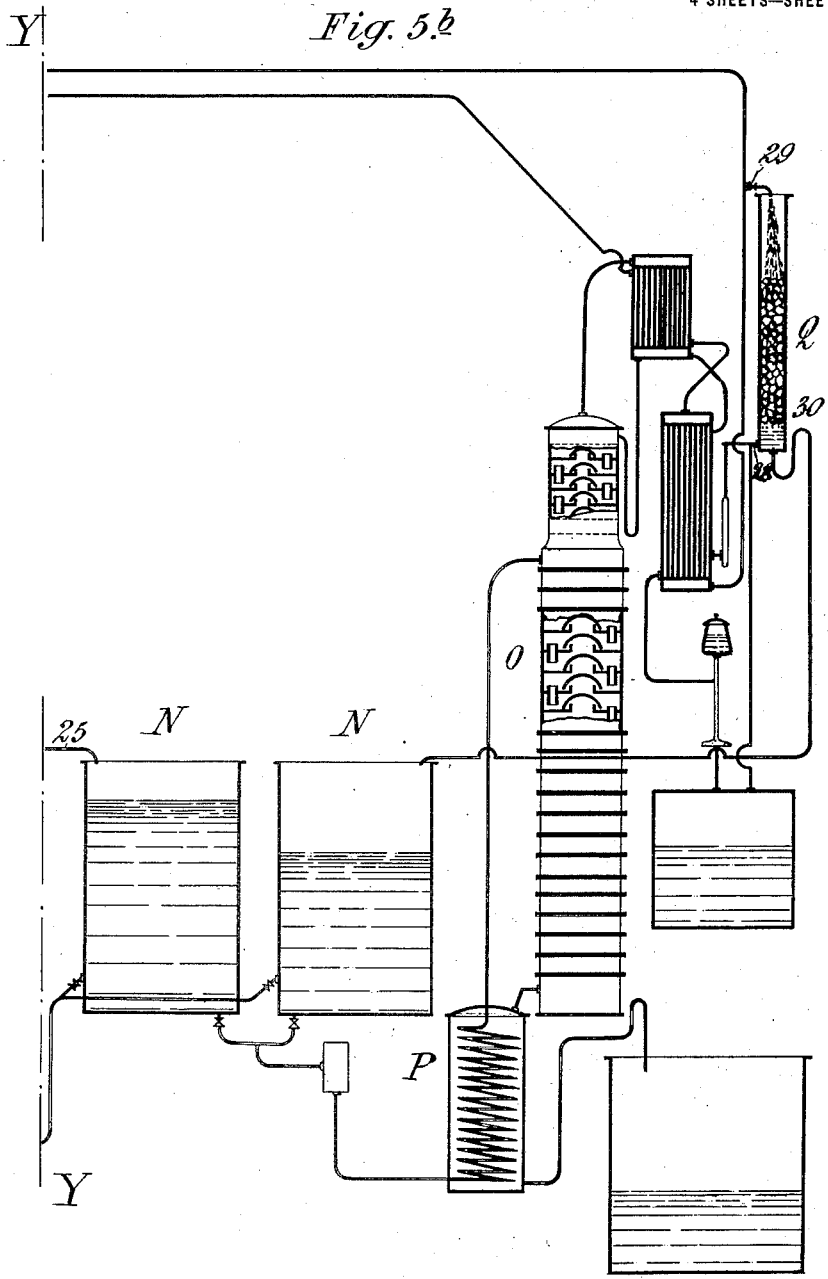

UNITED STATES PATENT OFFICE.

ELOI RICARD, OF MELLE, FRANCE.

MANUFACTURE OF ACETONE.

1,385,888.  Specification of Letters Patent.  Patented July 26, 1921.

Application filed June 7, 1918. Serial No. 238,730.

*To all whom it may concern:*

Be it known that I, ELOI RICARD, a citizen of the Republic of France, residing in the city of Melle, Deux-Sevres, in the Republic of France, have invented certain new and useful Improvements in the Manufacture of Acetone, of which the following is a specification.

The manufacture of acetone and butyl alcohol by fermentation of carbohydrate material, such as is practised at the present time, is imperfect because—

1.—The bacilli used require complex manipulation for their cultivation and application.

2.—The preparation of the carbohydrate material is costly.

3.—The apparatus used at different stages of the manufacture is inappropriate.

This invention relates to improvements in this manufacture, which consist essentially—

1. In the use of a new variety of bacillus, easy to cultivate, and serving indefinitely by transference from vat to vat.

2. In economizing time by charging the fermentation vats with cold wort; in economizing heat by recovering the heat used in mashing the grains and in distilling the wort; and in increasing the yield by recovering the vapors of acetone escaping at several stages of the process.

3. In making a suitable wort which can be properly fermented owing to the fact that the apparatus is sterilized by steam at all parts traversed by the wort.

The invention is more clearly set forth with reference to the accompanying drawings, which illustrate, by way of example, an apparatus suitable for the process.

Figures 1, 2, 3 and 4 show the new bacillus under different aspects.

Figure 5:
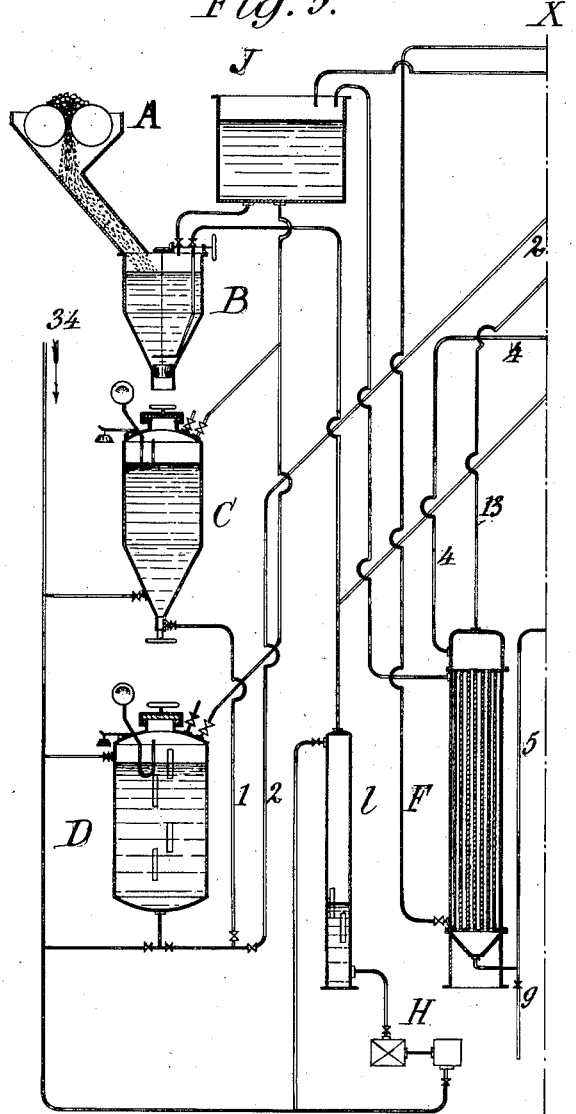

Figs. 5, 5ª, 5ᵇ together constitute a diagrammatic elevation of the apparatus.

The bacillus used, called butylicus B. F. (Boinot Firmin) exists in residual organic animal products.

It is found, for example, in the drawn-off liquid in the sewers or drains carrying off the washing waters of slaughter houses, as well as in the residuary waters of slaughter houses for horses.

It is easily isolated by the ordinary technique employed in bacteriology. Especially, its properties of development in the absence of oxygen are utilized, successive cultures in vacuum (2—4), in liquid medium, being made in order to eliminate the greatest part of aerobic microbes. This first selection having been carried out, there are then made cultures (2—4) in a solid medium, and at a depth in order to obtain separate colonies. The culture mediums employed can be meat, bouillon, glucose or mash of amylaceous materials to which has been added jelly or not.

Each of the colonies developed is studied in industrial mashes in order to determine morphological and biochemical characteristics of the individuals which form it. There are thus found colonies of bacillus "butylicus B. F.," which are recognized by the following characteristics clearly differentiating said colonies from bacilli of the same genus known or described.

The *Bacillus butylicus* B. F. is a cylindrical rod having unrounded ends $a$, measuring 3–5 $\mu$ long and 0.4 $\mu$ wide when it is young (Fig. 1), the length, for the most part, of the rods is generally comprised between 3.6 and 4 $\mu$. At the moment of sporulation it is inflated at the middle like a cigar ($b$, Fig. 2), and then contains one or two spores, its width being from 1–1.2 $\mu$. These spores $c$ are of cylindrical form and measure 0.5 $\mu$ in diameter. They issue by the ends of the rods which contract and then evacuate their protoplasm.

The butylicus B. F. is anaerobic; it sporulates very quickly in the media which it has fermented. The spores appear at the end of the fermentation and are nearly completely formed 4 or 5 days afterward. If at that time the culture is heated to the optimum temperature of 70° C. and sown in another sterilized culture medium, the spores germinate rapidly and give rise to a new generation of completely formed individuals in 8–10 hours.

The spores resist temperatures up to 95° C. during 5 minutes without destruction, the germination only being retarded by 4-5 hours.

Figure 1:
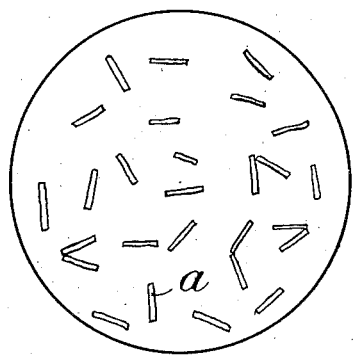
Figure 2:
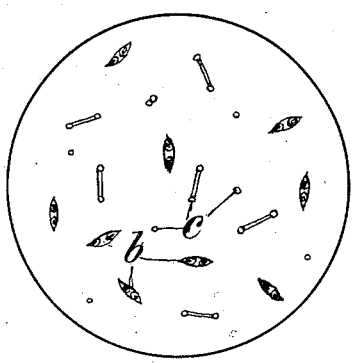
Figure 3:
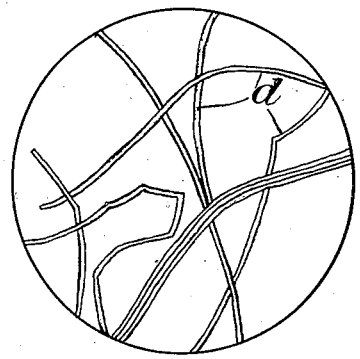
Figure 4:
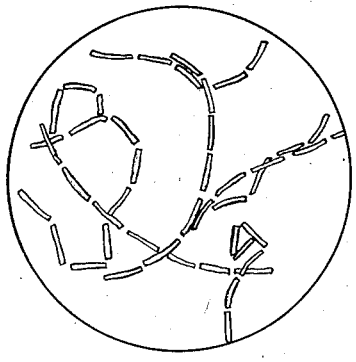

Microscopic examination of a preparation, stained by the Ziehl liquid, of a culture of butylicus B. F. from 18-20 hours old, produced from spores, shows the bacillus in the form of long filaments $d$ extending across the field of the microscope (Fig. 3) composed of a very large number of rods, the division lines of which are hardly perceptible. Some hours afterward these long filaments are split into detached rods (Fig. 4).

The butylicus B. F. develops well, evolves completely and exercises all its enzymic functions in a wort made from maize, rice, wheat, rye, barley, oats, buckwheat, dari, sorghum, manioc, potato, transforming their starch into a butyl alcohol and acetone with production of carbonic acid and hydrogen. A simple way of distinguishing the bacillus is by its behavior toward gelatin, which it does not liquefy.

It exerts only partially its enzymic functions in worts made from lupin, soja, beans, chestnut, artichoke, beetroot, the transformation of the carbohydrates of these materials into butyl alcohol and acetone being incomplete.

A sterilized wort made with one of the primary materials of the first series (maize for example) brought to 37° C. and sown with 2 per cent. of a culture in full activity, ferments completely in 28 to 30 hours. In course of fermentation it develops an organic acidity which continues to increase until about the 12th or 14th hour, and then decreases forthwith. The maximum acidity can attain 6.5 grams per liter expressed as butyric acid, but in general the maximum acidity is between 4.7 grams and 5 grams.

The fermenting wort may be used to the amount of 2 per cent. for sowing a new culture which develops exactly under the same conditions as the first culture. Successive cultures can thus be produced, apparently indefinitely, without enfeebling the enzymic properties of the butylicus B. F., while other varieties of bacilli deteriorate more or less and do not long fulfil their initial functions. The persistence of the enzymic functions of the butylicus B. F. in the cultures successively obtained by multiplication, by division without regeneration, by evacuation or by sporulation, is a characteristic which is particular to it in the worts in question and offers considerable industrial advantages by simplifying the preparation of cultures.

The butylicus B. F. comports itself equally well in the worts above indicated and develops normally in spite of important differences in their preparation. Thus there is no difference in the progress of its development in worts boiled under 3 kilos pressure for 3 hours or under 2 kilos pressure for 20 minutes, without acid or with acid.

When acid is employed, the amount of this latter can go up to 8 kilos of sulfuric acid to 1000 kilos of grain which is used; one can replace the sulfuric acid by hydrochloric acid or phosphoric acid. After the cooking performed with this quantity of acid, one neutralizes a portion of the acidity with sodium or calcium carbonate in order to reduce the quantity of acid to one kilogram of sulfuric acid per 1000 kilos of grain.

The advantage of cooking with acid is the obtaining of more liquid mashes for the starch is better disintegrated and undergoes a commencement of hydrolysis which partially dissolves it and brings it to one of the conditions which precede dextrin.

The application of the bacillus defined above to the preparation of acetone and of butyl alcohol by fermentation of amylaceous materials will now be described.

The amylaceous material is ground by a mill A suitable to the nature of the material. It falls into the mash tun B containing hot water. Here it is wetted and softened, whereby the subsequent boiling is facilitated. Moreover, the charge being thus prepared for the boiler, the operation in the latter is rapidly completed in some minutes. When the boiling process with acid above described is used, the mash tun B receives the necessary mineral acid.

The mashed material then descends through a wide pipe into the boiler C, and working under 2 kilos pressure, like those used in the manufacture of alcohol from grain, the mash is boiled under pressure for a suitable time and is thus discharged through pipe 1 by the pressure into a mixer D working under 2 kilos pressure and previously charged with water at 70—80° C. The wort coming from C mixes itself with the hot water already in D with sufficient agitation to insure equalization of temperature. By the time boiler C is empty the mixer D is charged with a wort at about 100° C. This temperature is maintained for some time or if desired may be raised to 115-120° C., if sterilization is to be insured. The diluted wort in D is now raised by steam pressure through pipes 2 into a reservoir E at a level above the fermentation vats GG₁, and under a pressure of half a kilo.

The boiler C, the mixer D and the wort vat E are provided with the necessary accessories, such as cocks $a$ for admitting steam from the pipe 34.

The wort in the reservoir E is kept at about 100° C. It flows by cock 3 and pipe 4 through a heat interchanger F, which cools it to 37° C.; thence it passes into a general charging pipe line 5 for charging the fermentation vats GG$_1$. These vats may be of any number, but it is advised to have 8–12 of them served by two or three groups of apparatus B, C and D. The vat that is being filled, G for example, is connected with the pipe line 5 by the vertical pipe 6 suspended from the cock 7 and connected with cock 8 by any sort of joint which can be made and broken at will.

The heat interchanger F is constituted by tubes placed in a closed envelop receiving the chilling water. When it is formed by a system of tubes, the latter should have bellows walls to facilitate dilatation during the sterilization, and should be soldered to the tube plates in such a manner as to insure absolute tightness; the wort chamber should be without any blind alley. The large joints of the tube plates form a receptacle for an antiseptic liquid.

The circuit starting from the cock 3 and including the heat interchanger F and the pipe line 5 may be sterilized as frequently as may be desired, by means of steam under pressure. For this purpose cock 3 is closed and cleansing cocks 9 and 10 situated at the end of the pipe line 5 are opened. Cocks 11 are then opened to admit steam which flows as indicated by arrow 33 and expands into all the parts traversed by the wort. When the sterilization is judged sufficient the steam is expelled by opening the cock 12 which allows pure air to pass into the system from the pump H. When the circuit is completely filled with air cocks 12, 9 and 10 are closed and cock 3 opened for the flow of the wort. The air contained in the circuit is expelled freely through the pipes 13, equalizing the pressure in the reservoir E.

The air from pump H is purified in suitable manner, as by passing it through a saline solution contained in a vessel I.

The substitution of pure air for the steam after sterilization is necessary for avoiding untimely condensation which would occur when the wort begins to flow and would cause derangements.

The cooling water which traverses the heat interchanger in the direction the reverse of the flow of the wort, passes into the reservoir J whence it is drawn for steeping the amylaceous material in B and for diluting the wort in D.

When either of the vats GG$_1$ is to be charged, the cock 8 in pipe 6 is opened. At the same time cocks 14 and 15 are opened so that steam may enter and expel the air from the vat G; this air issues by the pipe 16 and a bubbler K. A little later the steam which has taken its place leaves by the same path. Condensed water flows away by the cock 17.

The steam is left in the vat during one hour or more; whereafter it is expelled and its place taken by sterilized air admitted through the cock 18, or by the pure fermentation gases arriving by the connecting pipe line 19.

When all the steam has left the vat G and its place has been taken by the gas or by pure air, wort is admitted by opening the cock 7. When the vat has received a volume of wort equal to a fourth of its capacity, there is introduced a quantity of wort amounting to 5 per cent. of that in the vat, withdrawn from a neighboring vat in full fermentation and therefore containing the necessary bacteria. This transfer is made by connecting, by a coupling 20, two flexible pipes 21 proceeding from bell cocks 22 on the fermentation vats.

The circuit formed by 20, 21 and 22 is preliminarily sterilized by steam by use of means similar to those which have already been described.

At the beginning of the manufacture the first vat charged with wort is sown by adding the contents of a flask of culture of 2 liters capacity, prepared in the laboratory; the mixture is introduced into the vat through the tubulure 32 provided with a caoutchouc tube closed by a cork.

The fermentation vat G which we have taken for example, is refilled at the end of 3 or 4 hours, with the mash coming from the receptacle E. The fermentation begins toward the end of the filling operation, after introduction of the fermenting wort.

When the vat is full cocks 7 and 8 are closed and pipe 6 is disconnected from the latter to isolate this vat from the general pipe line 5 and in consequence from any other of the vats.

The gases which are disengaged during the fermentation bubble through the water contained in the vessel K and are thence carried away, or to apparatus for purifying and using these gases. This bubbling apparatus is for creating a hydraulic pressure of 50 centimeters of water in the fermentation vat so as to prevent reëntry of liquid which could contaminate the contents of the vat. Moreover, the progress of the fermentation can be observed, by noting the bubbling through a window 23 provided in the vessel K.

At the end of the fermentation there is often formed an emulsion of wort (notably with rice) which passes over into the bubbler and fills it.

This excess liquid or emulsion escapes by an overflow pipe 24 and runs through a general pipe line 25 into the storage vats N, the pipe 25 being provided at one end with a funnel into which the escaping liquid from several pipes 24 may flow.

When the fermentation is finished or on the point of being so, the vat is emptied by the bottom by connecting the cock 8 with a pipe 26 by means of a movable pipe 27. The fermented liquor is withdrawn by pump M and delivered into the storage vats N where its fermentation is completed and whence it is drawn as required for distillation. These vats are of any number but should normally represent a capacity equal to 30 or 40 per cent. of the capacity of the aseptic fermentation vats so as to have about 12 hours' reserve for distillation.

The distilling column O, suitable for the distillation of acetone and butyl alcohol, is of the ordinary type of column used for the distillation of alcoholic worts and possesses like parts. Before being delivered to the distilling column the fermented wort traverses a heat interchanger P for recovering the heat of the spent wort, and is thus heated to 70–80° C. By reason of the large mass of liquid to be subjected to distillation in relation to the small quantity of product to be extracted (1.5–1.8 per cent.) it is of great importance to heat the wort as much as possible by waste heat.

The distillation is conducted so as to obtain distillates of 60–70° of Gay-Lussac's alcoholometric scale. These distillates are then rectified to separate the acetone and butyl alcohol in an apparatus designed for this purpose.

Acetone boils at 56° C. and has a high vapor tension at ordinary temperature, causing an appreciable evaporation. On the other hand the fermented wort contains carbonic acid gas and hydrogen in solution which are disengaged in the distillation and traverse the condensers and refrigerators. These gases are saturated with acetone vapor difficult to condense. In order to avoid loss of acetone vapor there is used a washing column Q into the bottom of which are passed through pipe 28 the air and gases charged with acetone vapor. The pipe 28 communicates with the condensers and refrigerators of the distilling column and the rectifying apparatus and with the reservoirs containing distilled mixture of butyl alcohol and acetone and the pure acetone. A stream of water admitted at the upper part through a distributing cock 29 washes the inert filling of the column (coke, stones, scoria or the like). The spaces afforded by the filling permit free ascent of the air or gases, which are thus washed free of the acetone vapor. The washing water flowing away by the siphon 30 is a dilute solution of acetone, and the flow should be so adjusted that the washings contain about 5 per cent. of acetone; this solution is run into the still with the wort.

There is thus recovered, according to the surrounding temperature, 2-3 per cent. of the acetone produced.

The gases disengaged during the fermentation, toward the end of the latter are similarly treated in a like apparatus to recover acetone, the washing serving at the same time to purify the carbonic acid gas and hydrogen before they are applied for sundry purposes.

The treatment of amylaceous material hereinbefore described differs essentially from treatments having a like object, for example in the manufacture of alcohol by yeasts, in several points which will now be detailed.

The normal concentration of the worts in the butyl-acetonic fermentation is from 8–9 kilos of amylaceous material per hectoliter of wort. The yield obtained is from 38–40 per cent. of the starch or sugars contained in the parent material.

In the manufacture of alcohol, the concentration of the worts is from 25–27 kilos of amylaceous material per hectoliter of wort. The yield which is obtained is from 46–47 per cent. of the starch or sugars present in the material.

Then, for an equal weight of grain there must be used in the butyl-acetonic manufacture 3–4 times more steam for boiling the wort than in the manufacture of alcohol. To remedy these disadvantages the amylaceous material in C is boiled at a concentration of 20–25 per cent., and then diluted in D with previously heated water coming from J.

In the manufacture of alcohol the wort is sent into the fermentation vat as soon as it leaves the boiler and is kept boiling during the whole of the charging of the vat, whereafter it is cooled by a sheet of water running down the outer part of the vat. Under these conditions the time of filling a vat of 500 hectoliters for example, and the time of cooling the material to the best temperature for the introduction of the yeast are together about 20 hours. In the present process the system of charging through a heat interchanger permits of introducing the bacteria an hour or two after the beginning of the charging of the vat. There is therefore economy in time of about 18 hours.

The vats for the butyl-acetonic fermentation differ from those used for the alcoholic fermentation in that they do not have either a stirrer or a surface sprinkling apparatus or a system for introducing air into the mass. On the contrary, they have a system of heating by steam exhausted into the atmosphere through a circular perforated pipe 31 placed beneath the bottom of the vat. The heat disengaged by the butyl-acetonic fermentation is less than that disengaged by the alcoholic fermentation. In summer the wort in fermentation at 37° C. normally keeps its temperature but in winter the temperature is lowered by the surrounding cold and must be raised by external heating.

Finally, all the parts of the material of construction in contact with the amylaceous wort are arranged to be sterilized by steam and to receive subsequently pure gas serving to avoid condensation when the wort begins to flow.

The following is a detailed example of the manufacture:—

550 kilos of maize are finely ground in the apparatus A, and charged into the mash tun B of 35 hectoliters capacity containing 26 hectoliters of hot water (70–80° C.) previously admitted from the reservoir J.

Mashing is continued for half-an-hour, the material being stirred by a mechanical stirrer or by injection of air.

The contents of B are charged into the vertical boiler C of 40 hectoliters capacity, and heated with steam to a pressure of 2 kilos during 30 minutes. If the system of boiling described in the French specification No. 482582, aforesaid, is used, the pressure is maintained only during 10 minutes. At the end of this time the contents of the boiler are discharged by the pipe system 1 into the mixer D, the total capacity of which is 80 hectoliters. Into this apparatus 30 hectoliters of the hot water (70–80° C.) in reservoir J has previously been permitted to flow.

When C is completely empty the temperature in D is about 100° C. It is raised to 120° C. by heating with steam and maintained at this during 10 minutes. The contents of D are forced into the reservoir F; if the heat of the material contained in D is not sufficient to raise it into E, steam coming from 34 is admitted into the upper part of D onto the surface of the wort.

From reservoir E the wort is allowed to flow under control of cock 3 into the fermentation vat G after the parts situated in its path have been sterilized, as already indicated. The cooling of the wort is adjusted to 37° C. under observation of a registering thermometer 32.

At the end of about an hour, the vat G has received 100 hectoliters of wort. 20 hectoliters of the wort containing bacilli are now removed from a vat in full fermentation (this removal should occur between the 16th and 20th hour from the time when this vat was itself sown by wort from a preceding vat) and are introduced into the vat G through pipe system 20, previously sterilized as already indicated. At the end of 3–4 hours the vat G is completely filled and the fermentation has begun. It requires 7 operations with a group of apparatus B, C and D to charge the vat G with about 420–430 hectoliters. The vat then contains, 3,850 kilos of maize.

At the beginning of the fermentation the specific gravity of the wort is 3.5–4° Balling (see Balling or Brix scale, page 503, *Sadtler's Handbook of Industrial Organic Chemistry*, 1895, second edition, Lippincott,) it contains soluble starch and starch in suspension and it filters badly. The acidity is 0.2 gram, to 0.4 gram per liter expressed as sulfuric acid. During the first part of the fermentation (it may be 6 to 8 hours) the acidity increases and attains 2.4–2.6 grams per liter as sulfuric acid. Under the action of the bacteria the starch is transformed into organic acid without producing acetone and butyl alcohol. The density of the wort varies little. It has rather a tendency to increase since the undissolved starch becomes soluble little by little. In general at the end of 10 hours the formation of acetone and butyl alcohol can be detected. As soon as the production of these bodies has started it continues proportionally to time and becomes practically a constant relation of one part of acetone to two parts of butyl alcohol. The acidity then decreases and at the end of the fermentation it is about 0.4 gram to 0.8 gram per liter expressed as sulfuric acid.

The gas produced by the fermentation attains its maximum development at the end of 22–24 hours from the time when the vat is charged. It is then from 70–75 cubic meters per hour for a vat containing 3,850 kilos of maize. At the end of 24–26 hours from the charging of the vat the fermentation is finished; the contents are transferred to the storage vats N and distillation proceeds pro rata, producing distillates at 60–70° Gay-Lussac.

At the beginning of the manufacture when the vat of 500 hectoliters capacity is sowed with a 2 liter flask of culture (it may be 0.45 per 10,000), the duration of the fermentation is 42 hours from the time when the vat is charged.

The fermentation vat G produces about 900 kilos of acetone and butyl alcohol. It may be a yield of 23–24 per cent. of the weight of the maize used.

By this process the industrial production is at least 1 kilo of acetone and butyl alcohol per hectoliter capacity of the aseptic fermentation vat, and per day, a figure which has never been attained by similar processes.

I claim:—

1. A process for the manufacture of acetone and butyl alcohol by fermentation of carbohydrate material wherein the wort is fermented by a bacillus existing in organic residual animal products, identified by its having the form of a cylindrical stick with a rounded end, by its dimensions, and by its property of rapid formation of spores.

2. A process for the fermentation of hydrocarbonic substances as claimed in claim 1, wherein the fermenting tanks are previously sterilized by steam treatment and then aseptically cooled, before receiving the sterilized and cold mash.

3. A process of fermenting carbohydrate material as referred to in claim 1, wherein the wort is boiled in concentrated condition and is diluted with hot water to the required strength without supplementary expenditure of steam.

4. A process of fermenting carbohydrate material as referred to in claim 1, wherein the wort is subjected to a short boiling in a non-alkaline medium.

5. A process of fermenting carbohydrate material as referred to in claim 1, wherein the vapor of acetone escaping from the distillates containing acetone or consisting of acetone, from the rectifying apparatus and from the fermentation vats is recovered by washing substantially as described.

In witness whereof I have hereunto signed my name in the presence of two subscribing witnesses.

ELOI RICARD.

Witnesses:
   CHAS. P. PRESSLY,
   HENRI CARTIER.